Sept. 30, 1941.  C. FLODMAN  2,257,526
TRAILER HITCH FOR TOWING TRACTORS
Filed May 15, 1941  2 Sheets-Sheet 2
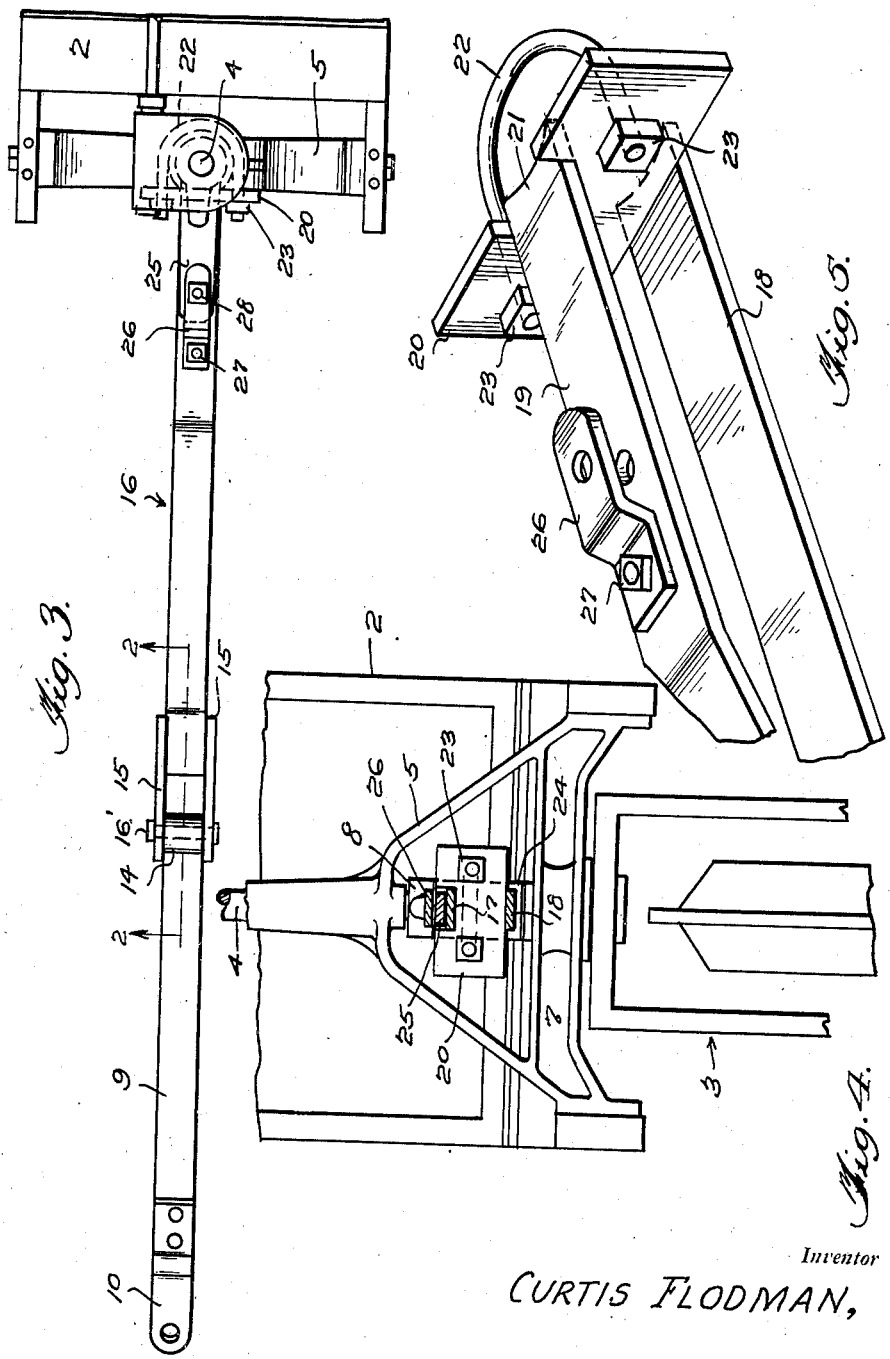
Inventor
CURTIS FLODMAN,
By Clarence A. O'Brien
Attorney Patented Sept. 30, 1941

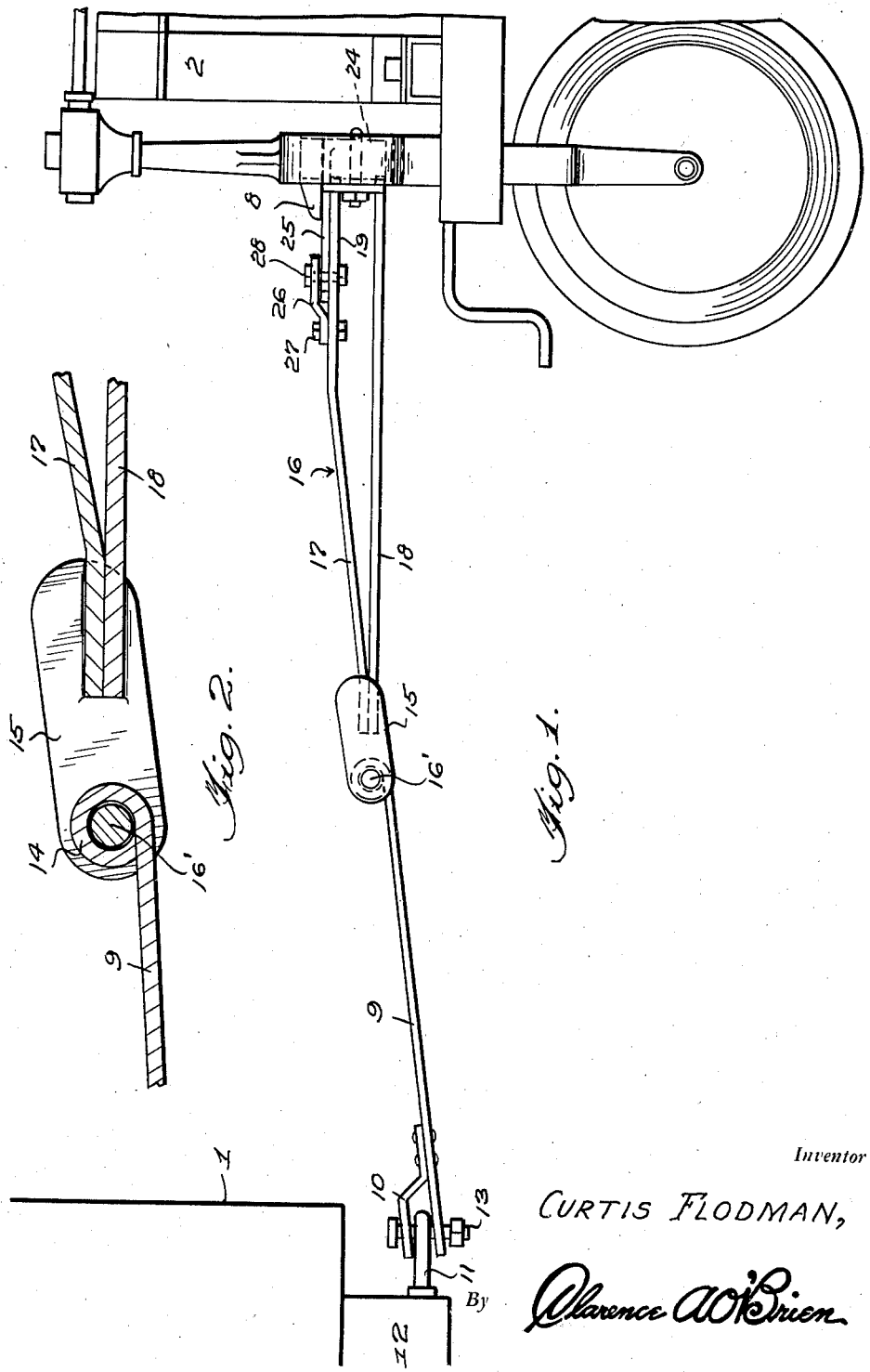

2,257,526

UNITED STATES PATENT OFFICE 2,257,526

TRAILER HITCH FOR TOWING TRACTORS

Curtis Flodman, Polk, Nebr.

Application May 15, 1941, Serial No. 393,625

3 Claims. (Cl. 280—33.5)

My invention relates generally to hitches for towing tractors and more particularly to improved trailer hitches for coupling truck to tractors to tow the same.

The primary object of my invention is to provide a hitch so designed that a truck may tow a tractor in perfect safety and steer the same thereby dispensing with an attendant on the tractor.

Another object is to provide a hitch for the purpose above set forth and particularly adapted for towing the tractor over uneven ground.

Other and subordinate objects are also comprehended by my invention, all of which, together with the precise nature of my improvement, will be readily understood when the succeeding description and claims are read with reference to the drawings accompanying and forming part of this specification.

In said drawings:

Figure 1 is a view in side elevation illustrating the preferred embodiment of my invention and application thereof.

Figure 2 is a fragmentary view in longitudinal section taken on the line 2—2 of Figure 3 and drawn to an enlarged scale.

Figure 3 is a view in plan.

Figure 4 is a fragmentary view in front elevation of the tractor with my hitch coupled thereto and shown in section, and Figure 5 is a fragmentary view in perspective of the draft tongue.

Reference being had to the drawings by numerals, my invention has been shown therein as coupling a truck, represented at 1, to a type of tractor 2 for which it is more particularly designed, and which is characterized by a castor type front steering wheel assembly 3 comprising a steering post 4 extending upwardly through a front yoke 5 on the tractor 2 into a bearing sleeve 6 on said yoke, the yoke embodying a lower horizontal cross bar 7. The steering post 4 has fixed thereon immediately below the lower end of the bearing sleeve 6, a forwardly extending stop arm 8 for engagement with opposite sides of the yoke to limit rotation of the assembly 3.

My improved hitch comprises a draft bar 9 of flat form having a clevis type front end 10 straddling the usual coupler 11 on the back end of the chassis 12 of the truck 1 and coupled thereto to swivel thereon by means of a bolt 13. The rear end of the draft bar 9 is rolled to provide a hinge barrel 14 fitted endwise between the front ends of a pair of laterally spaced parallel, cheek plates 15, forming a head on the front end of a draft tongue 16 presently further described. A bolt 16' extending horizontally through the front ends of said cheek plates 15 and the barrel 14 pivotally connects the draft bar 9 to the tongue 16 for vertical swinging thereon.

The draft tongue 16 further comprises a pair of upper and lower flat bars 17, 18 having front ends opposed flat and welded to said cheek plates 15 between the rear ends thereof. The lower bar 18 is straight. The upper bar 17 inclines upwardly and rearwardly from the lower one and is provided with a straight rear end portion 19 spaced from and parallel with the rear end portion of the lower bar 18. A vertically disposed cross bar 20 connects the rear ends of the bars 17, 18 and spaces the same apart, said bar 20 having a notch 21 in the top edge thereof through which the rear end of the upper bar 17 extends rearwardly of said bar 20 for a short distance. The rear end of the lower bar 18 extends rearwardly of said bar 20 for the same distance as bar 17. A U bolt 22, with nuts 23 thereon, extends through the bar 20 and clamps the rear ends of the bars 17, 18 to the front of a short sleeve 24 fast on the steering post 4 between the stop arm 8 and the yoke cross bar 7, said sleeve having extending forwardly from the upper end thereof a short flat arm 25 overlying the portion 19 of bar 17 and fitting in the notch 21 whereby the tongue 16 is interlocked with the sleeve 24 against lateral swinging around the steering post 4. A keeper link 26 is bolted at one end, as at 27, on top of the portion 19 of the bar 17 with its other end overlying the front end of the arm 25 and secured thereto by a bolt 28 extending through the link, arm 25 and portion 19. The rear ends of the bars 17, 18 are concave to fit the sleeve 24.

As will now be manifest, the draft tongue 16 may be quickly attached to the steering post 4 to turn the same by exerting leverage against said post through the short arm 25, the advantage of which will be obvious. The described pivotal connection 16', 14 of the draw bar 9 to the head of the draft tongue 16 provides for relative vertical play of said bar and tongue to compensate for tilting of the truck and tractor when traveling over uneven ground and the cheek plates 15 prevent relative lateral play of the draft bar 9 and draft tongue 16. Twisting of the described hitch is compensated for by the described swivel connection 10, 11, 13 of said bar to the truck.

The foregoing will, it is believed, suffice to impart a clear understanding of my invention without further explanation.

Manifestly the invention, as described, is susceptible of modifications without departing from the inventive concept and right is herein reserved to such modifications as fall within the scope of the subjoined claims.

What I claim is:

1. A hitch for coupling a truck to the upright shank of a castor-type steering wheel of a tractor, said hitch comprising a draft tongue having a rear end plate provided with an upper edge notch, a U bolt for securing the plate to said shank to extend forwardly thereof, an arm adapted for attachment to said shank above said plate to interfit with said notch, a pair of cheek plates extending forwardly from the front end of said tongue upon opposite sides thereof, respectively, and a draft bar pivotally mounted between said plates for vertical swinging movement.

2. A hitch for coupling a truck to the upright shank of a castor-type steering wheel of a tractor, said hitch comprising a draft tongue having a rear end plate provided with an upper edge notch, a U bolt for securing the plate to said shank to extend forwardly thereof, an arm adapted for attachment to said shank above said plate to interfit with said notch, a pair of cheek plates extending forwardly from the front end of said tongue upon opposite sides thereof, respectively, and a draft bar pivotally mounted between said plates for vertical swinging movement, said draft tongue comprising a pair of upper and lower bars fixed at front ends thereof to said plates, the upper bar diverging upwardly and rearwardly from the lower one, said pair of bars being secured to said plate adjacent the upper and lower edges of the latter.

3. A hitch for coupling a truck to the upright shank of a castor-type steering wheel of a tractor, said hitch comprising a draft tongue having a rear end plate provided with an upper edge notch, a U bolt for securing the plate to said shank to extend forwardly thereof, an arm adapted for attachment to said shank above said plate to interfit with said notch, a pair of cheek plates extending forwardly from the front end of said tongue upon opposite sides thereof, respectively, and a draft bar pivotally mounted between said plates for vertical swinging movement, and a keeper link fast at one end to said tongue and having its other end bolted to said arm.

CURTIS FLODMAN.